(12) United States Patent
Choi

(10) Patent No.: US 7,782,934 B2
(45) Date of Patent: Aug. 24, 2010

(54) PARAMETER SCANNING FOR SIGNAL OVER-SAMPLING

(75) Inventor: Hoon Choi, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 519 days.

(21) Appl. No.: 11/856,640

(22) Filed: Sep. 17, 2007

(65) Prior Publication Data

US 2008/0069196 A1 Mar. 20, 2008

Related U.S. Application Data

(60) Provisional application No. 60/845,581, filed on Sep. 18, 2006.

(51) Int. Cl.
*H03H 7/30* (2006.01)
(52) U.S. Cl. ..................... 375/231
(58) Field of Classification Search ............... 375/226, 375/229, 232, 350, 355, 371; 370/503, 516
See application file for complete search history.

(56) References Cited

U.S. PATENT DOCUMENTS

| | | | |
|---|---|---|---|
| 6,606,360 B1 | 8/2003 | Dunning et al. | |
| 6,897,793 B1 | 5/2005 | Kim et al. | |
| 6,907,096 B1 | 6/2005 | Lueker et al. | |
| 7,116,735 B2* | 10/2006 | Yamada et al. | 375/354 |
| 7,149,269 B2 | 12/2006 | Cranford, Jr. et al. | |
| 7,236,553 B1 | 6/2007 | Choi et al. | |
| 7,450,038 B2* | 11/2008 | Choi | 341/100 |
| 7,693,088 B2* | 4/2010 | Daugherty et al. | 370/253 |
| 2004/0022196 A1 | 2/2004 | Rivoir | |
| 2004/0136731 A1* | 7/2004 | Wang et al. | 398/208 |
| 2005/0259726 A1* | 11/2005 | Farjad-rad | 375/232 |
| 2006/0222129 A1 | 10/2006 | Hadzic et al. | |
| 2007/0280392 A1 | 12/2007 | De Laurentiis et al. | |
| 2009/0154626 A1* | 6/2009 | Anderson et al. | 375/360 |

OTHER PUBLICATIONS

Notice of Allowance mailed Jan. 22, 2008 for U.S. Appl. No. 11/592,792.

* cited by examiner

*Primary Examiner*—Khanh C Tran
(74) *Attorney, Agent, or Firm*—Blakely Sokoloff Taylor & Zafman

(57) ABSTRACT

A method and apparatus for parameter scanning for signal over-sampling. An embodiment of an apparatus includes an equalizer to equalize received data values, and a sampler to over-sample the equalized data. The apparatus includes an eye monitor to generate information regarding quality of signal eyes for the over-sampled data, and an equalization monitor to generate information regarding sufficiency of signal equalization. The apparatus further includes a scan engine to scan possible values of a plurality of parameters for the apparatus.

25 Claims, 14 Drawing Sheets

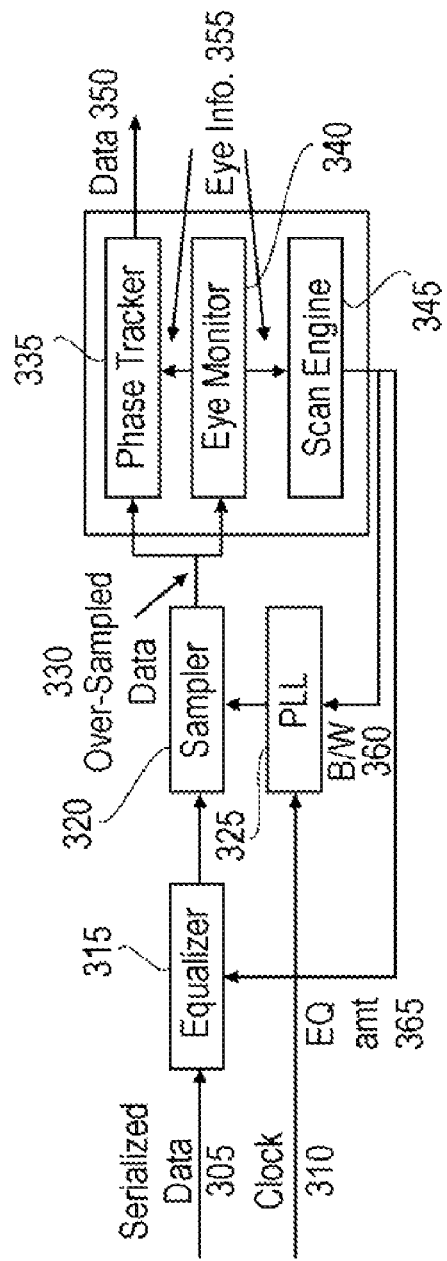
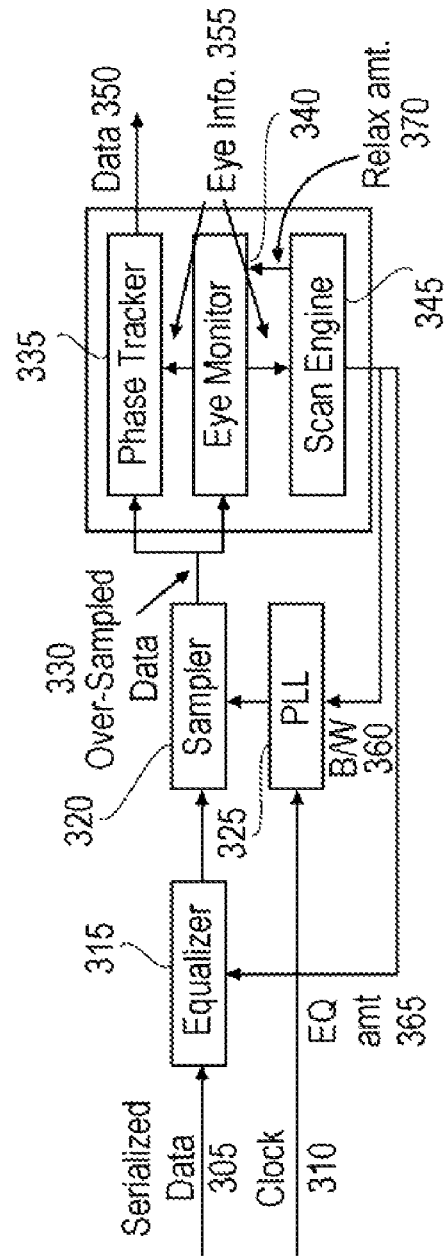
FIG. 3A
FIG. 3B (BW1, EQ1) → (BW1, EQ2) → (BW1, EQ3) → ... → (BW1, EQn) →
(BW2, EQ1) → (BW2, EQ2) → (BW2, EQ3) → ... → (BW2, EQn) →
...
(BWm, EQ1) → (BWm, EQ2) → (BWm, EQ3) → ... → (BWm, EQn) →

FIG. 5A

Relax amt = 10
(BW1, EQ1) → (BW1, EQ2) → (BW1, EQ3) → ... → (BW1, EQn) →
(BW2, EQ1) → (BW2, EQ2) → (BW2, EQ3) → ... → (BW2, EQn) →
...
(BWm, EQ1) → (BWm, EQ2) → (BWm, EQ3) → ... → (BWm, EQn) →

FIG. 5B

Relax amt = 9
(BW1, EQ1) → (BW1, EQ2) → (BW1, EQ3) → ... → (BW1, EQn) →
(BW2, EQ1) → (BW2, EQ2) → (BW2, EQ3) → ... → (BW2, EQn) →
...
(BWm, EQ1) → (BWm, EQ2) → (BWm, EQ3) → ... → (BWm, EQn) →

FIG. 5C $(BW_1, EQ_1) \to (BW_1, EQ_2) \to (BW_1, EQ_3) \to \ldots \to (BW_1, EQ_n) \to$
$(BW_2, EQ_1) \to (BW_2, EQ_2) \to (BW_2, EQ_3) \to \ldots \to (BW_2, EQ_n) \to$
...
$(BW_m, EQ_1) \to (BW_m, EQ_2) \to (BW_m, EQ_3) \to \ldots \to (BW_m, EQ_n) \to$

FIG. 9A $(BW_1, EQ_1) \to (BW_1, EQ_2) \to (BW_1, EQ_3) \to \ldots \to (BW_1, EQ_n) \to$
$(BW_2, EQ_1) \to (BW_2, EQ_2) \to (BW_2, EQ_3) \to \ldots \to (BW_2, EQ_n) \to$
...
$(BW_m, EQ_1) \to (BW_m, EQ_2) \to \mathbf{(BW_m, EQ_3)}$

FIG. 9B

Proposed Search with Pruning
$(BW_1, EQ_1) \to (BW_1, EQ_2) \to (BW_1, EQ_3)$
$\downarrow$
$(BW_2, EQ_3)$
$\downarrow$
$\mathbf{(BW_m, EQ_3)}$

FIG. 9C

PARAMETER SCANNING FOR SIGNAL OVER-SAMPLING

RELATED APPLICATIONS

This application claims the benefit of U.S. Provisional Application 60/845,581 filed Sep. 18, 2006.

TECHNICAL FIELD

Embodiments of the invention generally relate to the field of electronic devices and, more particularly, to a method and apparatus for parameter scanning for signal over-sampling.

BACKGROUND

Digital receivers often operate by sampling received signals. Transferred data may be, but is not limited to, audio-visual media data. In this process, a signal representing a digital signal may be sampled at certain times to determine the value. In particular, over-sampling may be used to provide multiple sample measures for each data unit in a sequence of data.

The multiple samples may assist in dealing with data containing certain levels of noise. In the absence of noise, all samples in a digital data unit should be the same if the samples are properly aligned, but the values may vary if there is intermittent noise in the signal. The multiple values may, for example, be utilized to assist in determining the appropriate signal value.

However, differences in data phase, amplitude, pulse width, and other issues may result for various reasons in a data transmission. Different transmitters may have different characteristics, and the cabling distance between transmitter and receiver will affect transmitted data. Data tracking and the setting of certain receiver parameters may address some data issues, but variances in data and noise make it difficult to provide satisfactory settings for a receiver. As a result, signal quality can suffer, which, for example, may result in poor display quality for audio-visual data.

SUMMARY OF THE INVENTION

A method and apparatus are provided for parameter scanning for signal over-sampling.

In a first aspect of the invention, an apparatus includes an equalizer to equalize received data values, and a sampler to over-sample the equalized data. The apparatus includes an eye monitor to generate information regarding quality of signal eyes for the over-sampled data, and an equalization monitor to generate information regarding sufficiency of signal equalization. The apparatus further includes a scan engine to scan possible values of a plurality of parameters for the apparatus.

In a second aspect of the invention, a method includes receiving a series of signals, and equalizing the received signals using an equalization value. A clock signal is generated based at least in part on a bandwidth value, and the received signals are over-sampled using the clock signal. The equalization and eye quality of the received signals are monitored, and possible values of parameters are scanned. A combination of parameters for data reception is identified.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3A illustrates an embodiment of receiver processing circuitry that utilizes over-sampling;

FIG. 3B illustrates an embodiment of circuitry implementing relaxed eye operations;

FIGS. 5A, 5B, and 5C illustrate embodiments of scanning sequences for an over-scanned receiver;

FIGS. 9A, 9B, and 9C illustrate embodiments of scanning sequences for an over-scanned receiver;

DETAILED DESCRIPTION

Embodiments of the invention are generally directed to parameter scanning for an over-sampling receiver.

As used herein, "over-sampling" means sampling a signal at a higher frequency than the frequency of the signal. For example, over-sampling may include sampling a signal multiple times in at least some cycles of the signal.

In some embodiments, parameter scanning is provided for a signal over-sampling receiver. In some embodiments, an over-sampling receiver scans through parameters to identify parameters that provide sufficient performance.

In embodiments, a system evaluates signals using the sampled signals to determine whether a signal "eye" is open or closed, with the number of signal eyes that are open or closed being counted. In some embodiments, a system operates to relax eye restrictions if parameters are not identified that provide sufficient performance.

In some embodiments, a system provides for scanning certain parameters separately from other parameters, thereby reducing the amount of time and processing required to identify usable parameters. In some embodiments, a system may separate equalization factors from other parameters.

Figure 1:
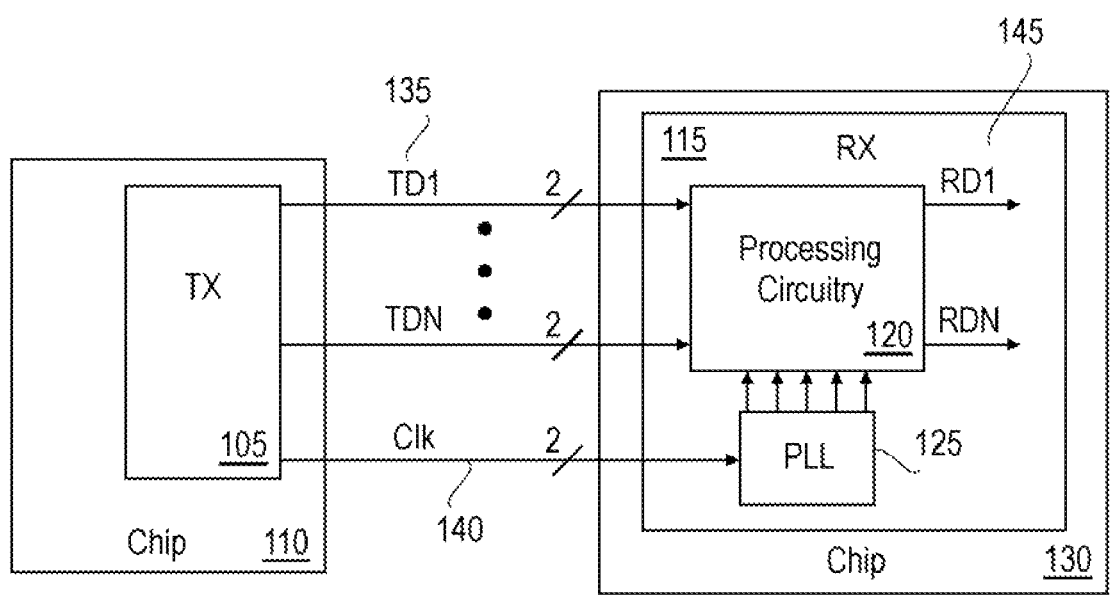
FIG. 1 illustrates a schematic representation of an embodiment of a communication system.

FIG. 1 illustrates a schematic representation of an embodiment of a communication system. In this illustration, a transmitter (TX) 105, which may be included in a first chip 110 or other apparatus or device, and a receiver (RX) 115, which may be included in a second chip 130 or other apparatus or device, may include multiple differential serial links carrying serial data $TD_1$ to $TD_N$ 135 and a clock signal 140. The serial data may include, but is not limited to, audio-visual media data, such as multiple serial data streams to represent the color components of visual data. The clock signal 140 may be provided to a locked loop circuit (such as phase locked loop (PLL) 125) that, in one example, generates five outputs to over-sample the incoming data over the differential links 135 utilizing processing circuitry 120 of the receiver 115. The over-sampled data (OSD) in this example would include five different samples in each cycle of the incoming data. However, embodiments are not limited to any particular number of samples per signal cycle. Embodiments may include any number of samples in any cycle, and the number of samples could vary between signal cycles. The processing circuitry 120 produces a set of received data $RD_1$-$RD_N$ 145 based on the samples taken of the serial data $TD_1$ to $TD_N$ 135.

However, the operation of the receiver 115 may include various parameters that affect the data reception operation. In some embodiments, the receiver 115 provides for parameter scanning in the over-sampling process to identify parameters that provide sufficient signal quality.

Figure 2:
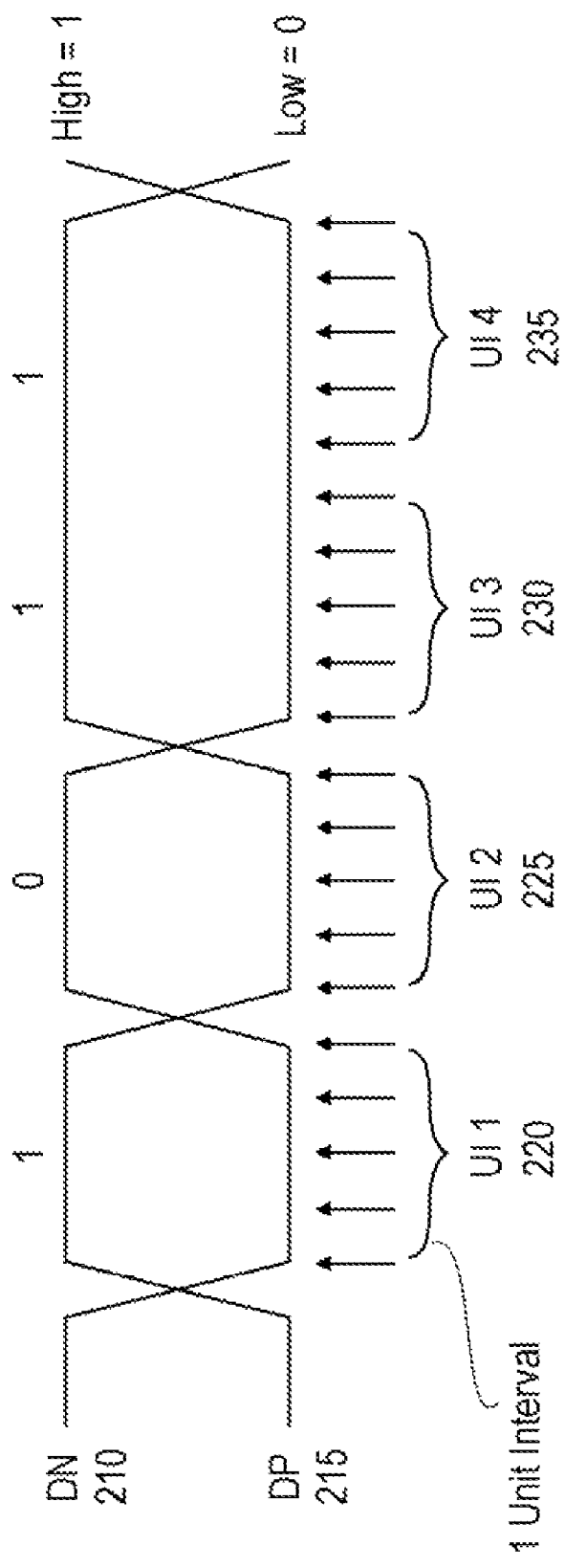
FIG. 2 illustrates an embodiment of signal sampling.

FIG. 2 illustrates an embodiment of signal sampling. In this illustration, an idealized example of incoming serial data received 205, which may be, for example one or any of $TD_1$-$TD_N$ 135 of FIG. 1, includes a differential signal pair DN (negative differential signal) 210 and DP (positive differential signal) 215, with the combination of the signals providing each bit of data. In this illustration, one bit of data is provided in a time unit that may be referred to as a unit interval (UI). In FIG. 2, four UIs are illustrated, which are denoted UI-1 220, UI-2 225, UI-3 230, and UI-4 235. For example, during UI-1 the data bit has a logic high value (which in this case represents a value of "1" with low having a value of "0", but in other cases the values may be reversed or designated with different values.) During interval units UI-2 225, UI-3 230 and UI-4 235, the data bits are "0", "1", and "1" values, respectively. In this example, during each UI there are five data samples clocked by the five outputs of the PLL, as indicated by arrows in FIG. 2. In this differential signal, the incoming signal during a UI (such as UI-1 220) may be referred to as an "eye".

In operation, because of jitter and other factors, the data bits that are transported may not be presented as desired, including issues regarding the signal alignment. If the data bits are far enough off in phase, these data "eyes" are said to be "closed". If an eye is aligned in phase within a particular tolerance, the eye is said to be "open".

In some embodiments, an eye monitor may generate information regarding data by examining, for example, 50 over-sampled data elements (OSDs) in a 5× over-sampling system over a period of 10 unit intervals. Each "eye" in this example corresponds to 5 OSDs, thus there are a total of 10 eyes in the incoming 50 OSDs (and thus ten groups of 5 OSDs). In a particular phase tracking algorithm or process, there is a pointer (referred to herein as a "center pointer") that points to one specific OSD among the 5 OSDs in each eye that the algorithm believes is at the center of the eye. The value of the sampled OSD at the center is used as the representative value of the represented eye. In some embodiments, the eye monitor checks at certain times to determine whether the center pointer is actually at the center of the eye. In some embodiments, the eye monitor checks the center point by determining whether the three OSDs (i.e., one pointed by the pointer, and the other twos adjacent to the pointed one) have the same value. If it is the case, the eye is marked as "open". In some embodiments, if all the 10 eyes in 50 OSDs are open, a counter referred to as an "open counter" may be incremented, while if any of such eyes are closed, a "closed counter" may be incremented. The open and closed counters may operate for a predefined time period, which may be set at a length that is long enough such that the operation is not affected by any brief noise occurrences. In some embodiments, a ratio of the closed counter value and the open counter value measured over the defined time period is reported to a phase tracker and to a scan engine. Other embodiments may include different details in such a process.

Referring again to FIG. 1, the processing circuitry 120 processes the incoming data to provide received data $RD_1$-$RD_N$ 145. In a possible embodiment, data may be audio-video data that is separated into video and audio components, but this is not required for all embodiments. In various embodiments, the processing circuitry 120 may include different sub-logic components and interconnects. Examples that may be included in the processing circuitry for some embodiments include, but are not limited to, equalization logic, samplers, phase trackers, eye monitors, and scan engines. Certain examples are provided in the figures and discussion following herein. In some embodiments, there may be more than one clock signal and in some embodiments, the clock signal may not be sent with the data signals. In some embodiments here may be more than one PLL to provide different signals for sampling different data streams.

In some cases, received input data is not of sufficient quality for the processing circuitry to generate meaningful received data. For example, the data may have "closed eyes" because the data is out of phase by too great of a degree. In some embodiments, processing circuitry elements are provided to locate meaningful data in such transmitted data. In some embodiments, data recovery processes for high-speed serial data receivers include certain phase tracking elements to assist in selecting which of multiple over-sampled data elements to use. In some embodiments, a parameter scanning procedure is utilized to determine which of various receiver parameters (such as equalization amount, PLL bandwidth, and others) may be utilized in a phase tracker with digital PLLs (DPLLs). In some embodiments, such processes may be utilized to provide assistance in obtaining useful information from transmitters that have varying different characteristics (such as non-coherent operation, coherent operation, and other characteristics).

In some embodiments, processes for a receiver include a parameter scanning procedure using a "relaxed eye" technique. FIG. 3A illustrates an embodiment of receiver processing circuitry that utilizes over-sampling. The serialized data 305 provided by a transmitter (such as TX 105 in FIG. 1) is received by a receiver 300, and is provided to an equalizer 315. In addition, the transmitter may provide a clock signal 310 that is generated by a locked loop circuit (PLL 325). The equalizer 315 boosts the data (in the form of an analog signal), with the amount of boost being based on the equalization amount 365 from a scan engine 345, and passes the data to a sampler 320. The sampler 320 over-samples the input analog data and generates digital over-sampled data 330. In this process, the sampler 320 utilizes the clock signal received from the PLL 325, whose bandwidth (B/W) 360 is controlled by the scan engine 345. The PLL 325 may be a digital PLL in some embodiments, but this is not required for all embodiments. The same PLL may be used for each input stream, or different PLLs may be used for different input streams. The over-sampled data is provided to a phase tracker 335 and an eye monitor 340. In some embodiments, the eye monitor 340 computes eye quality information 355 and reports this quality information to the phase tracker 335 and the scan engine 345. The phase tracker 335 uses the eye quality information 355 at least in part to select a tracking algorithm to track a phase of the received data, and the scan engine uses the received information to determine the best parameters for the system as the scan engine scans through such parameters, with such parameters including the PLL bandwidth 360, the equalization amount 365, and other possible parameters. The phase tracker then outputs the decoded data 350.

In some embodiments, the eye monitor 340 may generate eye information as follows: The eye monitor 340 examines over-sampled data elements in an over-sampling system. As described above, this may be 50 over-sampled data elements in a 5× over-sampling system, with each eye corresponding to 5 OSDs. A center pointer points to one designated OSD among the OSDs for each eye, and this designated OSD is used as the representative value of the eye. In some embodiments, the eye monitor 340 operates to check whether the pointer is actually at the center of the eye. In an embodiment, the eye monitor 340 determines whether a certain number of OSDs, such as the three central OSDs for an eye, these being the OSD designated by the center pointer and the other two adjacent on each side to the designated OSD, have the same value. If so, the eye is determined to be "open", which indicates that the bit value is in phase with the receiver. In some embodiments, if all eyes for a group are open, an "open counter" is incremented. If one or more of the eyes are closed, then a "closed counter" is incremented. The ratio of the counter values is reported to the phase tracker 335 and the scan engine 345.

In some embodiments, the operation of a scan engine may include the following: The scan engine may operate to scan through possible parameters to identify parameters that will provide sufficient data quality. For an equalization amount (EQ) parameter, the scan engine may search from a minimum value (for example, an EQ value appropriate for a signal transversing a short cable) to a maximum value (for example, for an EQ value appropriate for a signal transversing a long cable). The receiver in a serial link product should work well with different lengths of cables. For a long cable, it may be necessary to boost up the signal based on the cable's frequency characteristics to compensate for the weakened signal, and this process may be referred to as equalization. The differences in cable length requires different amount (or strength) of equalization. For a long cable, there is typically a need for more (or stronger) equalization, while for a short cable there is typically less (or weaker) equalization required. If insufficient equalization is applied to a particular signal (such as a signal provided over a long cable), this generally will result in poor signal quality and a large amount of noise. On the other hand, if equalization that is too strong (too large) is applied to a particular signal (such as signal received over a short cable) this will result in over-boosting the signal, which generally also results in a poor signal quality with excessive noise. The equalization amount may thus require adjustment depending on cable length or similar factors. In addition, different characteristics of various transmitters that are used may also influence the selection of the equalization value.

In the process of scanning for parameters, if the scan engine finds an equalization value (EQ) that results in the eye monitor reporting sufficient signal quality (a value indicating that that the data eyes are open), the scan engine may stop at this point and uses this value to drive the equalizer. However, if the scan engine is not able to find such a value in the parameter scanning process, the scan engine may reach the EQ maximum value, and may then remain there until another condition occurs to restart the scanning. One reason for the process remaining at the maximum is that if the data is carried by a long cable there may be a good chance that all the EQ values (even the maximum value) are not sufficient to cause the eye to be open. In this case, the maximum value may be the best value that is available. In some embodiments, the PLL bandwidth parameter may be searched as well as EQ value, with the scan engine searching through each possible combination of these two parameters. For example, if there are 4 possible EQ values and 3 possible BW values, the scan engine would search up to 12 possible parameter combination candidates to find a combination that provides a sufficient result.

However, the search for the best parameters may result in a circumstance that is referred to as being "stuck to the maximum", particularly in some cases in which the jitter factor for the signal is fast and large. If the jitter is too fast and large for the phase tracker to properly track and direct the center pointer to the center of the eye, the pointer may become skewed from the center of the eye. In this circumstance, some of the 10 eyes in the 50 OSDs may be reported as closed and, because not all the 10 eyes are open, the "closed counter" is incremented. This may eventually lead to the scan engine trying larger EQ values in an attempt to find an EQ that will cause all eyes to be open. However, since the problem may not be insufficient equalization but rather the limit of tracking speed, the larger EQ value will also fails to generate sufficient adjustment to cause the eye monitor to report the data eyes open. In this circumstance, the scan engine may continue the scan and try increasingly larger EQ values, until the scan engine reaches the maximum EQ value, and the process may then be stuck there, regardless of the actual cable length. However, this maximum EQ value will causes a problem if in fact there is a short cable since this level of equalization would be excessive for the signal. This may cause over-shooting and may result in glitches in the OSDs. In some embodiments, a relaxed eye technique may be utilized in a parameter search to address this issue.

FIG. 3B illustrates an embodiment of circuitry implementing relaxed eye operations. FIG. 3B has many similarities to FIG. 3A, with the addition of a "relaxation amount" signal 370 that is provided by the scan engine 345 to the eye monitor 340. In FIG. 3A, a rule provided that only if all the 10 eyes of 50 OSDs are open would the "open counter" be incremented. Otherwise, the "closed counter" was incremented. In some embodiments, a relaxed eye technique instead provides that if a certain number N eyes among the 10 eyes are open the "open counter" is incremented. Otherwise, the "closed counter" is incremented. In an embodiment, the system may first attempt to use the full number of eyes in the group for the number N (this is 10 in this example), and, if it is possible to determine parameters that cause the eye monitor to report "eye open", then the process ends at this point. In some embodiments, if it is not possible to identify working parameters even after trying all the combinations of parameters, then the value of N is decremented (to 9 in this example), and the parameter search process is repeated. If working parameters are found at this value, the process can cease here, or otherwise the process can restart the scan with N being decremented again (reduced to 8 in this example). This procedure may be repeated until N reaches a predefined lower limit.

To support the relaxed eye technique, the scan engine 345 provides a "relaxation amount" 370 (which thus may be the current minimum value of N or a related value) to the eye monitor 340, instead of simply receiving eye information from the eye monitor 340. This technique may be intended to provide a result (a parameter set) that is equal to or better than the parameter set that would without eye relaxation. If N is 10, the process is the same as illustrated and described with regard to FIG. 3A. By gradually reducing N, a process will search a larger possible solution space than a circumstance in which N=10, with the allowable counts for the closed counter being incremented unless each eye is open. The relaxed eye technique may avoid the "stuck to maximum" condition because, by reducing N, it is often possible to locate parameters that are less than perfect but are good enough to provide sufficient signal quality. Experimental results can illustrate that such "good enough parameters" with reduced N provide a better image for audio-visual data than the image that results from the "stuck to maximum" situation. In some embodiments, the eye monitor includes a counter that counts the number of open eyes in 50 OSDs, and a comparator to compare the number of open eyes to the current relaxation amount.

Figure 4:
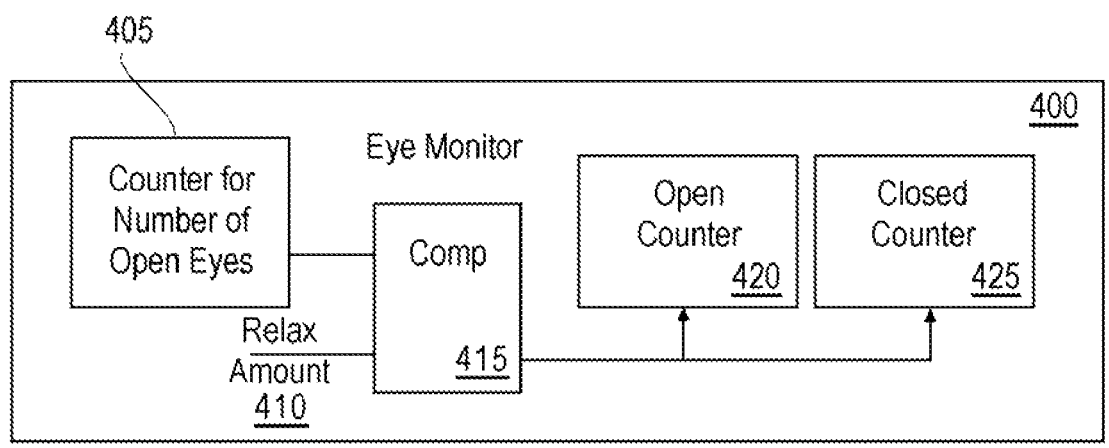
FIG. 4 illustrates an embodiment of an eye monitor that utilizes a relaxed eye process.

FIG. 4 illustrates an embodiment of an eye monitor that utilizes a relaxed eye process. In this illustration, an eye monitor 400 includes a counter 405 to count the number of open eyes in a set and a comparator 415 to compare the number of open eyes 405 with the current relaxation amount N 410. If the number of open eyes is greater than or equal to the relaxation amount N, then the open counter 420 is increased, and otherwise the closed counter 425 is increased. In one example, if the current relaxation amount is 9, then the open counter will be incremented if 9 or more eyes are open in a set, and the closed counter will be incremented if 8 or fewer eyes are open in the set. In other embodiments, certain details of the eye monitor may be different, and the comparison may be provided in a modified manner.

FIGS. 5A, 5B, and 5C illustrate embodiments of scanning sequences for an over-scanned receiver. FIG. 5A illustrates a scanning sequence for combinations of bandwidth BW and equalization EQ parameters that are provided to the equalizer and the PLL without utilization of a relaxation eye technique. While this scanning sequence provides a particular example in which the equalization is gradually increased for a first bandwidth, followed by the same sequence for a second bandwidth, embodiments are not limited to any particular sequence of the parameters, or for any particular number of different parameters. FIG. 5B illustrates a scanning sequence for combinations of bandwidth BW and equalization EQ parameters that are provided to the equalizer and the PLL with the utilization of a relaxation eye technique, in which a relaxation amount is initially N=10, which in this example provides the same sequence of parameter combinations as FIG. 5A during a first scan sequence. If the sequence illustrated in FIG. 5B does not result in a satisfactory result, N may be reduced (to 9 in this example), and the parameter scanning sequence is repeated with this reduced eye openness requirement. FIG. 5C illustrates the search being repeated with the relaxation amount being N=9. If the search process identifies parameters that lead to the set number of open eyes, the search process can stop at this point. Otherwise, the scan may be repeated with N set to 8. This process may repeat until N reaches a predefined lower limit.

Figure 6A:
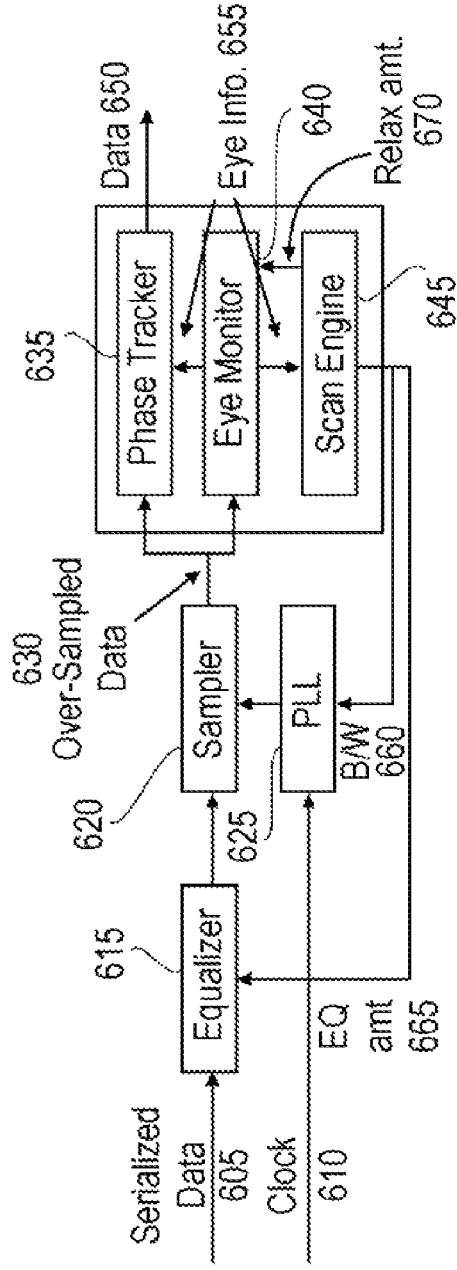
FIG. 6A illustrates an embodiment of receiver processing circuitry providing over-sampling.

In some embodiments, a process may be provided to increase the speed of a parameter scanning procedure using a separate "equalization monitor" together with an eye monitor technique. FIG. 6A illustrates an embodiment of receiver processing circuitry providing over-sampling. In this illustration, serialized data 605 from a transmitter is received by a receiver and is provided to an equalizer 615, together with a clock signal 610 that is provided to a PLL 625. The equalizer 615 boosts the data (as an analog signal) based on an equalization amount EQ 665 that is received from a scan engine 645, and passes the equalized data to a sampler 620. The sampler 620 over-samples the input analog data and generates digital over-sampled data 630. In this illustration, the sampler 620 uses a clock signal received from the PLL 625, whose bandwidth (BW) 660 is controlled by the scan engine 645. The PLL 625 may be a DPLL, but this is not required in all embodiments. The same PLL 625 may be used for each input stream, or different PLLs may be used for different input streams. The over-sampled data 630 is provided to both a phase tracker 635 and an eye monitor 640. The eye monitor 640 computes the eye quality and reports this quality to the phase tracker 635 and the scan engine 645. The phase tracker 635 uses the eye information 655 at least in part to select the tracking algorithm, and the scan engine uses the eye information 655 to decide the best parameters such as the PLL bandwidth, equalization amount, and other parameters. The relaxation amount signal 670 may be provided as indicated with regard to FIG. 3B. The phase tracker 635 outputs the decoded data 650.

In some embodiments, the scan engine may operate by performing a full search of all possible combinations of parameters. For example, FIG. 9A illustrates a search process sequence in which there are m bandwidth parameters (BW) and n equalization parameters (EQ). In this example, the scan engine tries the (BW1, EQ1) candidate and checks the result from the eye monitor. If eye monitor reports a value indicating sufficient data quality ("eye is open"), the scan engine may stop at this point, and the PLL and the equalizer may use these values for BW and EQ. If this is not the case, the eye monitor tries the next candidate (BW1, EQ2) and checks the result. This process repeats until the eye monitor identifies the parameter combination candidate that results in opening the eye, or the eye monitor reaches the limit (BWm, EQn).

Though this scanning technique may generally provide good results in handling various transmitters utilizing various cables (varying in length and quality) and similar issues, a full search of all parameter combinations based on such a scanning algorithm may take more and more time as the number of parameters and the resulting combinations grows. For example, if there are 3 PLL BW values as well as 4 EQ values, the scan engine will potentially search 12 possible combinations of those two parameters. As the number of possible EQs and BWs increases, the number of combinations increases more. In another example, if there are also three different relaxation amounts (RLXA) as a third possible set of parameters, the search now potentially becomes 3×4×3=36 parameter combinations, which may require a non-negligible time for the scan engine.

To address this issue, some embodiments include a process to separate the equalization amount scanning from other parameters. For the previous example, the total candidates to be scanned may instead be 3 (BW)×3 (RLXA)+4 (EQ)=13 combinations instead of 36 combinations. A reason to select EQ over other parameters (such as BWs, RLXAs, or others) for separate evaluation is that the EQ value may be largely or completely orthogonal to other parameters, and thus its effect can be measured largely independently from the others. Equalization affects the actual time period, or "width", of a "1" (or "0") pulse in analog domain, and it thus may affect the number of "1s" or "0s" in over-sampled data (OSD). If there is perfect equalization for a given cable (length and characteristics), there are 5 (for 5× over-sampling system) "1s" or "0s" in OSD for each data "1" or "0. If the equalization is not perfect, the resulting narrower pulse may reduce to fewer samples per unit, such as only 4 or 3 samples. In contrast, other parameters such as bandwidth or relation amount may have little effect on the width of "1" or "0" pulses. In some embodiments, it is thus possible to independently measure the effect of equalization and find the best equalization amount, and as a result reduce the searching space required for establishment of parameters for a receiver.

Figure 6B:
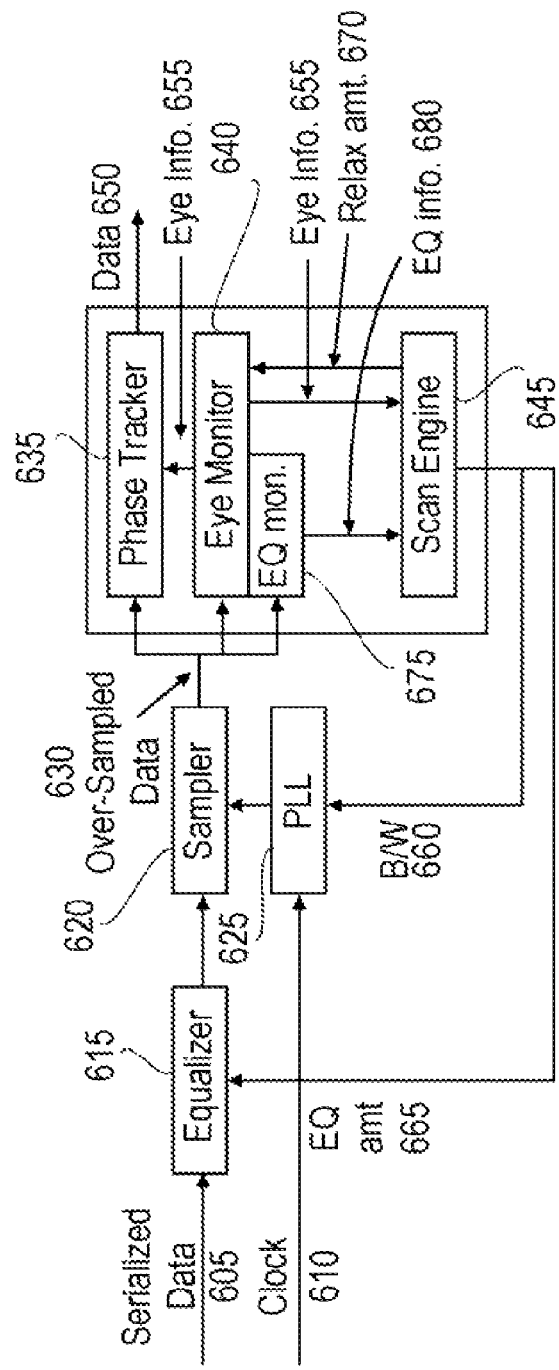
FIG. 6B illustrates an embodiment of receiver processing circuitry providing over-sampling and utilizing an equalization monitor.

FIG. 6B illustrates an embodiment of receiver processing circuitry providing over-sampling. This illustration provides a similar system to the system illustrated in FIG. 6B, with the addition of an equalization (EQ) monitor 675. In some embodiments, an EQ monitor 675 generates "EQ information" 680 that indicates whether the current equalization is or is not sufficient by measuring the width of "1" or "0" pulses.

Figure 7:
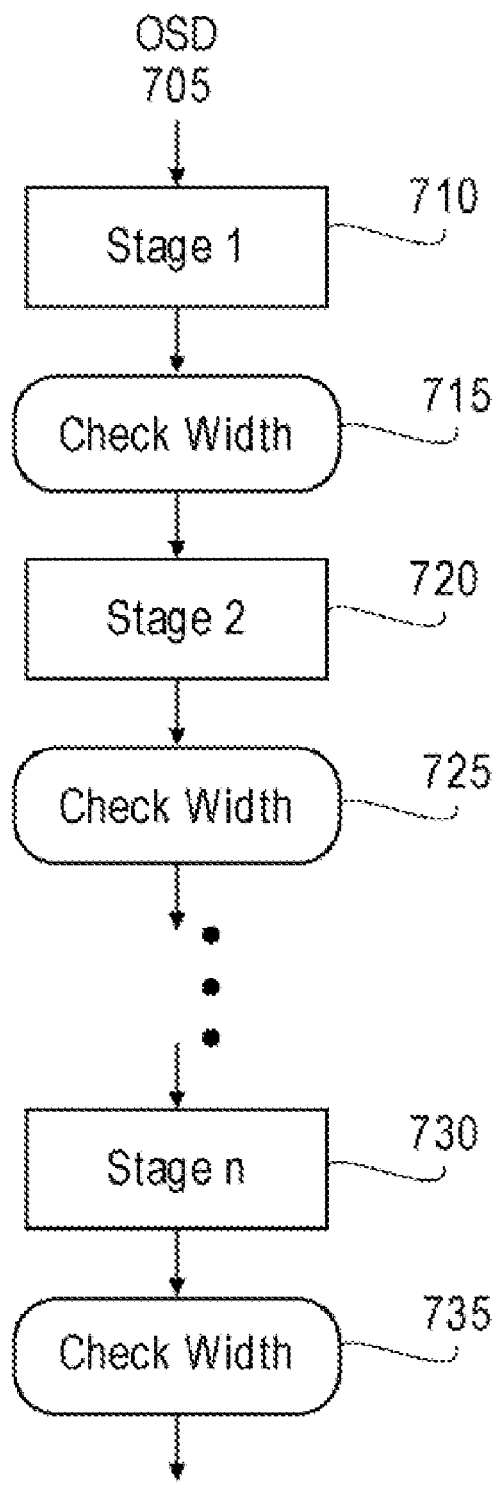
FIG. 7 illustrates a width measuring process including multiple stages of processing.

In various embodiments, a measurement of the width of a signal may be implemented in several different ways. A difficulty in providing this measurement by, for example, counting samples may occur because the actual center of each "1" or "0" pulse is not known, and thus it follows that the start of each "1" or "0" may not be known. To address this problem, FIG. 7 illustrates a width measuring process including multiple stages of processing. In this illustration there are, for example, 5 stages in a pipeline-like arrangement used to store OSD. At each stage, there is a determination, starting from the current first position, whether there is a pulse that is wide enough (such as providing for 4 or 5 samples). For example, the OSD data 705 may be received at a first stage 710, in which the width is checked 715. This may continue with shifting to the next sample in a second stage 720 and a check of the pulse width 725. This process may continue to check the width of each pulse, through to a stage n 730 and a check of width 735, thus checking all the possible start points of the pulse. In this process, it will be possible to utilize the various results to determine what the current signal width is. In other embodiments, other depths of processing may also be used, depending on, for example, how many samples are taken from each pulse.

Figure 8:
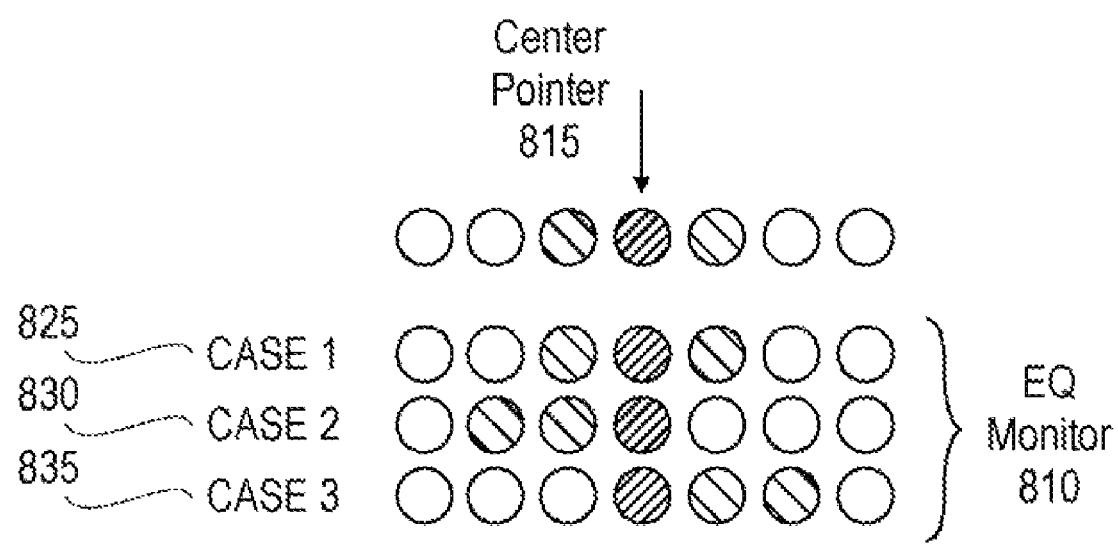
FIG. 8 illustrates a width determination process utilizing sample values

In some embodiments, an EQ monitor may implement a process that is similar to that used for an eye monitor. This process is based on the assumption that the center pointer in the phase tracker may track the signal jitter in a non-perfect way. In the process described for an eye monitor above, there is a determination whether the 3 OSDs centered at the center pointer have the same value. This determination checks not only the width of each pulse, but also whether the pointer is at the center of the eye. However, in a process for the EQ monitor, it may be necessary only for there to be a check of the width. In some embodiments, some skew allowed in the center pointer. FIG. 8 illustrates a width determination process utilizing sample values. In this process, the shaded circles represent the OSDs checked by a monitor. The first case 825 for the EQ monitor is the same as that assumed for the eye monitor, with the center pointer 815 pointing at the center of the pulse and the samples on each side of the center sample having the same value. However, in the second case 830 and the third case 835, there is allowed one OSD skew of the center pointer 815 in checking the width of the pulse, with there thus being a determination that three of the central samples have the same value. By allowing this skew, even if the center pointer is not at the center of the eye, it is still possible to determine whether the equalization is sufficient or not with regard to the width of a data pulse. The EQ monitor may use other features that are included the eye monitor, including, but not limited to, a low pass filter to allow the monitor to see enough image data before the decision may be used.

In some embodiments, a scan engine may include a pruning capability to assist in reducing scanning requirements. Referring to FIG. 9B, a search is provided that is similar to that provided in FIG. 9A. In FIG. 9B, if (BWm, EQ3) is the best parameter, it was necessary to proceed through all the other prior combinations until the parameter combination (BWm, EQ3) was reached. Parameter combinations beyond (BWm, EQ3), as shown in FIG. 9A, are not examined. In some embodiments, the process may be accelerated through use of pruning of the search. FIG. 9C illustrates a scanning process with pruning capability. In this illustration, when the process reaches (BW1, EQ3), the scan engine determines that EQ3 is sufficient based on the report from the EQ monitor. However, in this example, the eye monitor may be reporting that the eye is not open, and thus the engine may determine that the BW still needs to be modified. In an embodiment, rather than continuing to (BW1, EQ4) in the parameter scan, the scan continues to the next BW with the same EQ, this being (BW2, EQ3) in this example. If this parameter combination opens the eye, the parameter scan stops at this point. If it is not the case, scan engine tries the next BW with the same EQ, which in this example is illustrated as (BWm, EQ3). Other combinations are not examined. In some embodiments, this pruning process may be implemented, for example, by changing the increment logic of counters whose values represents each candidate and are used for searching for receiver parameters.

In some embodiments, an equalizer is digitally controlled for adaptive equalization. The following describes a process to digitally control an analog equalizer for the adaptive equalization in the over-sampling based serial link receiver products. This process monitors the over-sampled data for each possible equalization value and decides the best one. This approach enables us to use a simple analog equalizer for the adaptive equalization instead of a complex analog adaptive equalizer.

To provide the correct amount of equalization for a receiver, analog equalizers have commonly been used. However, such equalizers may be very sensitive to design details, as are other high performance analog blocks, and may difficult to design for high speed signals. Thus, a digital control may be provided for a simple analog equalizer for the adaptive equalization effect instead of complex analog equalizers.

Figure 10:
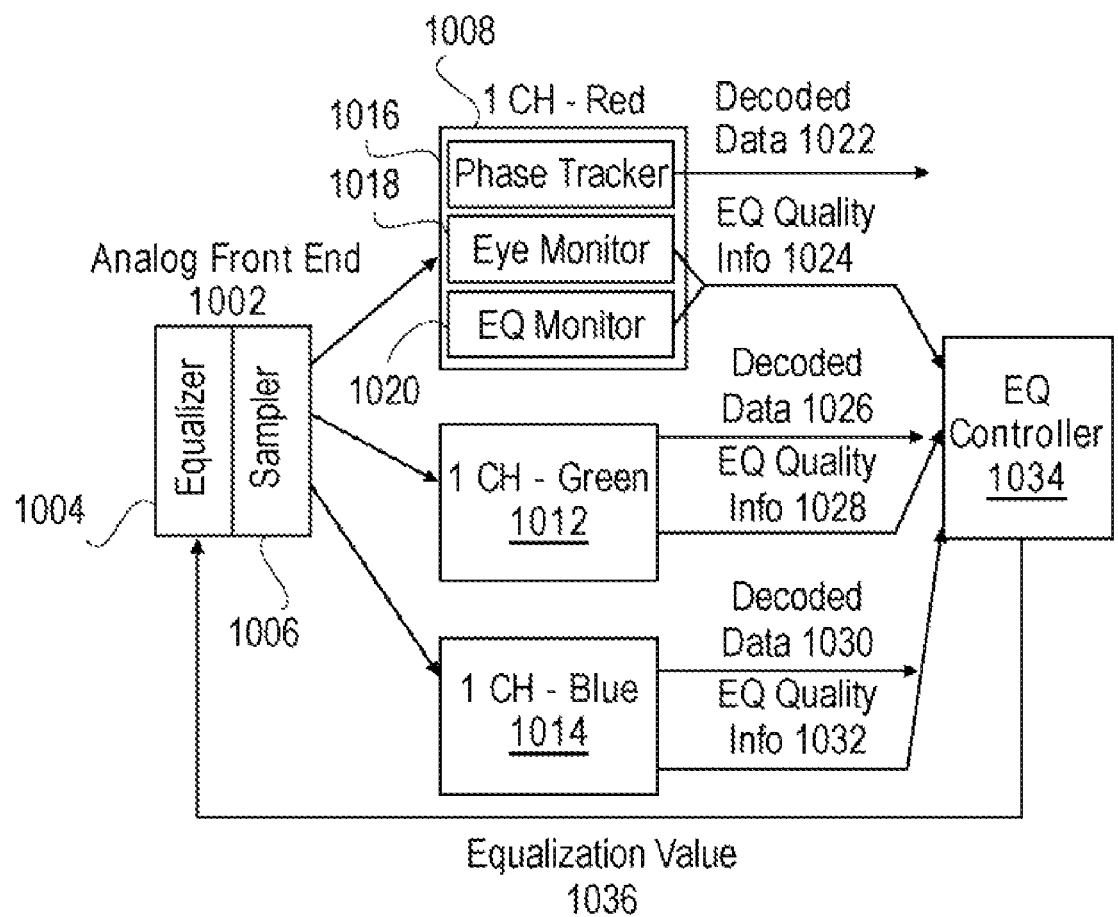
FIG. 10 provides a diagram of an embodiment of a receiver system.

FIG. 10 provides a diagram of an embodiment of a receiver system. This illustration specifically regards a video signal, but embodiments of the invention are not limited to this type of signal. In this illustration an analog front end 1002 includes an equalizer 1004 and sampler 1006. In some embodiments, a separate subsystem is provided for R (red) 1008, G (green) 1012, and B (blue) 1014 signal components, with each subsystem having a phase tracker 1016 (which outputs the decoded data 1022, 1026, and 1030), an eye monitor 1018, and an equalization monitor (EQ monitor) 1020. The eye monitor 1018 examines the level of openness of the eye based on the over-sampled data. The output of the eye monitor 1018 indicates whether an eye is open to a particular standard. The eye monitor 1018 may be used to tune a phase tracking algorithm for the phase tracker 1016. The EQ monitor 1020 examines the over-sampled data and determines whether the current equalization amount is, for example, not enough (under equalization) or too much (over equalization). The eye monitor 1018 and EQ monitor 1020 together provide EQ quality information 1024 (1028 and 1032). The EQ quality information for each channel may be provided to an EQ controller 1034, which will determine an equalization value 1036.

In the EQ monitor 1020, a particular fact regarding signal reaction to equalization may be used to detect the "under equalization case." In "under equalization", the short "1" signal after a series of "0's" (or a short "0" signal after a series of "1's") becomes shorter than normal. For example, if it is assumed that a transmitter sent "1101" bit stream. In a 5× over-sampling receiver for normal operation (i.e., if the EQ value is correct) the over-sampled signal is 11111_11111_ 00000_11111. However, in "under equalization" circumstances, the over-sampled signal becomes 11111_11111_ 0000_11111, i.e., the "0" is over-sampled as four "0's" instead of normal five "0's". This characteristic may be used in detecting under equalization.

On the other hand, "over equalization" may generate an overshoot in the transition edge of a signal. However, this characteristic may not be easy to detect in over-sampled data because even if there is overshoot, the sampler's output is similar to a normal case. In some cases, the short "1" signal after a series of "0's" is over-sampled as six "1's", thus the opposite of under equalization effect.

However, in many cases it may not be easy to detect the over equalization case from the over-sampled data alone. Because of this, a process may be applied to identify the best EQ value based only on the under equalization detection.

In this process, an issue to be determined is how easy or difficult it is (i.e., what is the level of implementation cost) to detect the long "1's" and short "0" (or long "0's" and short "1") case. This may be referred to as determining possible inter-symbol interference (ISI).

In a 5× over-sampled receiver, 50 bits of over-sampled data (OSD) are provided at each cycle. Thus, to detect ISI case, would be possible to compare a "11111_11111_0000" mask (which actually is "111111111_0000" because of the long "1" signal) to all the possible 50 positions in the OSD (because the location of the start of long "1's" is not known), which may be very expensive to implement. In some embodiments, a less expensive alternative approach may be implemented. In this process, two facts are used affect the implementation. First, in a DE=0 period (indicating a sync period), control characters are sent, with the control characters being in the form of "1101010101", "0010101010", "1101010100", or "0010101011". It can be seen that each control character has a possible ISI position, such as the "0" in the third position in "1101010101", the "1" in the first position and the "0" in the third position in "1101010100", etc. Thus, in a DE=0 (sync) period there is at least one possible ISI position in each character (each 10-bit character in this instance). Even if there is not an actual check of the ISI case it is possible to determine approximately the number of possible ISI cases and the number of "under equalization cases" actually happening in possible ISI cases simply by counting the number of narrow "1's" or "0's".

However, detecting the narrow "1's" or "0's" ("1111" instead of "11111" or "0000" instead of "00000" in OSD) may still be expensive because OSD is not aligned, thus a system would not know where the start and end points of "1's" or "0's" are. Because of this, 5 cases are required for each possible 5 bit offset in order to check the narrow "1's" "0's", which is computationally expensive. As an alternative, the center point may be used to reduce the operational cost. The center pointer is the pointer (to one of positions 0 to 4 of a signal, for example) from which the data value in an OSD is selected. The phase tracker always attempts to locate the center pointer at the center of the eye. The center pointer tries to align itself to the center of each 5 over-sampled data. During a tracking procedure, the center pointer may not always be aligned to the center, but if tracked over time it generally is located at the center of the eye and tracks the center. Because of this, the center pointer acts to show where the 5 bit boundary (start/end) for each bit in the OSD is located. Therefore, it is not necessary to consider the 5 possible offset cases. In some embodiment, instead a system is required to only to check only one case.

In some embodiments, the EQ monitor uses these facts and identifies "under equalization" by checking the narrow "1's" or "0's" in a DE=0 period. The EQ monitor counts the number of bits and the number of narrow bits in the DE=0 period and if the ratio of the latter one to the former one is more than a certain threshold, the EQ monitor determines that "under equalization" is present.

In some embodiments, the EQ controller gathers "under equalization" information from each channel. In addition, it gathers "eye openness" information from the eye monitor of each channel. Based on the information, the EQ controller evaluates each possible EQ value (candidates for the best fit) and selects the best one. For example, it may be assumed that there are n possible EQ value candidates, i.e., EQ0, EQ1, EQ2, ... EQn. In this example, EQ0 is the weakest EQ value and EQn is the strongest equalization. EQ controller resets when there is an occurrence such as the power being turned on and/or a cable being plugged in. Upon resetting, the EQ controller first tries $EQ_0$. The EQ controller applies $EQ_0$ to the equalizer, and waits for the end of EQ monitor's operation and eye monitor's operation. If the eye is open, it may be concluded that current equalization is sufficient. If the eye is closed, then the output of the EQ monitor may be examined. If the data indicates that there is under equalization, EQ monitor will indicate "under equalization", and otherwise will determine that the current equalization is acceptable. If there is under equalization, the EQ monitor will try EQ1. If EQ1 still results in under equalization, then the EQ monitor will try EQ2, and continue until EQn if necessary. On the other hand, if current equalization is sufficient, the EQ monitor stops at this point and uses the current value. In an embodiment, the EQ monitor always starts from the weakest equalization value, i.e., EQ0, and increases from this point. In such system, the reason for this order of processing is that the EQ monitor can generally detect "under equalization", but not the "over equalization." Thus, the process may start from the weakest level of equalization and stop when there is no longer any finding of "under equalization."

In some embodiments, the EQ controller will reset and starts its operation again in certain circumstances, such as when a cable is plugged in, when a clock signal comes through a cable, when power is turned on, etc. In some embodiments, when the EQ controller finds the best fit, it retains the results of EQ monitor and the eye monitor, and if there is a significant amount of change in these values, then it will reset and starts the search again. This may be done to prevent the EQ controller from being stuck to one value even if some condition has changed and it is no more the best fit.

The EQ controller receives "done" or "under equalization" signals from each channel. The EQ controller evaluates the results of the EQ monitors if and only if all three "done" signals become activated indicating that all three EQ monitors finished their operations. The EQ controller determines that there is "under equalization" if at least one channel says "under equalization". This is cone because there is usually a difference in each channel's characteristics. For example "blue" may indicated that equalization is sufficient but "green" indicates "under equalization". In such a case, there is an attempt to increase the equalization value.

In some embodiments, a "relative-eye" concept is used to improve the performance of a digitally controlled analog equalizer for adaptive equalization in the over-sampling based serial link receiver products. In some embodiments, the relative-eye concept measures the relative-eye as well as the absolute-eye from the over-sampled data and decides the best equalization value. This approach may lead to better selection of equalization value than previous methods.

An approach may be used to digitally control a simple analog equalizer for the adaptive equalization effect that can replace complex analog equalizers. However, there may be two problems with this approach. First, the process detects the under equalization based on a short "1" (or "0") after long "0's" (or "1's"). This method may have a problem with some transmitters that are noisy and constantly make narrow "1" (or "0") regardless of the equalization value. With such transmitters, the previous algorithm reaches a conclusion that even the maximum equalization value might not be enough even for a short cable. Second, to reduce the implementation cost in detecting the short "1" (or "0") after a long "0's" (or "1's"), the method measures narrow "1" ("0") only in DE=0 period. However, DE=0 period sometimes shows a different eye shape compared to that in DE=1 period. So, measuring equalization effect only in DE=0 period cannot represent the real equalization effect in many cases.

In some embodiments, a different approach is used to address these issues. In some embodiments, a proposed approach is based on a fact that a correct equalization increases the eye openness. In this approach, there is first a measurement of the eye openness, and based on this measurement the best equalization value may be determined.

In some embodiments, two different eye measurements may be used. One is absolute-eye openness and the other is relative-eye openness. The former one is the eye measurement used for DVI compliant sources, and the latter one is for DVI non-compliant sources. Since the latter one can also cover the DVI compliant sources in a way, only the relative-eye is used. Both of these values exist in an implementation to provide for more accuracy for DVI compliant sources, but in some cases only the latter is used.

The relative eye is the eye defined based on the current center pointer. It is measured by counting the number of adjacent OSDs having the same value as the one pointed out by the center pointer. For example, if it is assumed that the center point is at the center of 00000 (5 OSDs in 5× over-sampling system), it may be said that the pulse it is 100% open. On the other hand, for 10001 it may be determined that 60% is open, and for 11011 it is said 20% is open. This information is used to measure the eye openness for each possible equalization value candidate.

However, since this relative-eye openness depends on the value of current center pointer that can constantly move, it is possible to get an incorrect value of eye openness in the middle of center pointer changing. For example, given OSD 11100000 if the center pointer is at the 6th position the eye is 100% open. However, if the center pointer is currently at 5th position and under going to 6th, the eye is reported as 80% open. This means that in eye openness computation some possible errors should be allowed. For this a counter is used and if the ratio of the error is lower than some threshold value, the error may be ignored and the eye openness value is obtained. For example, in a possible implementation, a counter called narrow_eye_open_60 is incremented by 1 if the eye is not 60% open in one measure, and at the end if the ratio of narrow_eye_open_60 to the number of total tests is less than a threshold, it may be said that the eye is 60% open.

This eye measurement may be performed regardless of DE value. This is possible because, in some embodiments, it is not necessary to detect the short "1" ("0") after long "0's" ("1's") case that was required in the previous method and made us to measure only in DE=0 period to reduce the implementation cost.

This relative-eye openness information is calculated for each possible candidate value and based on this information the best value is chosen. In an alternative, there may be a check of the eye openness from the minimum value of the candidates and if an equalization value that opens the eye more than a specific % (for example 60%) the process may stop there and use the current values.

In some embodiments, some of the above-described details of this section are not used or are used in modified form.

The following describes two methods to handle input streams coming from coherent transmitters in non-coherent over-sampling based phase trackers that may be used in some embodiments of the inventions, but is not used in other embodiments.

Figure 11:
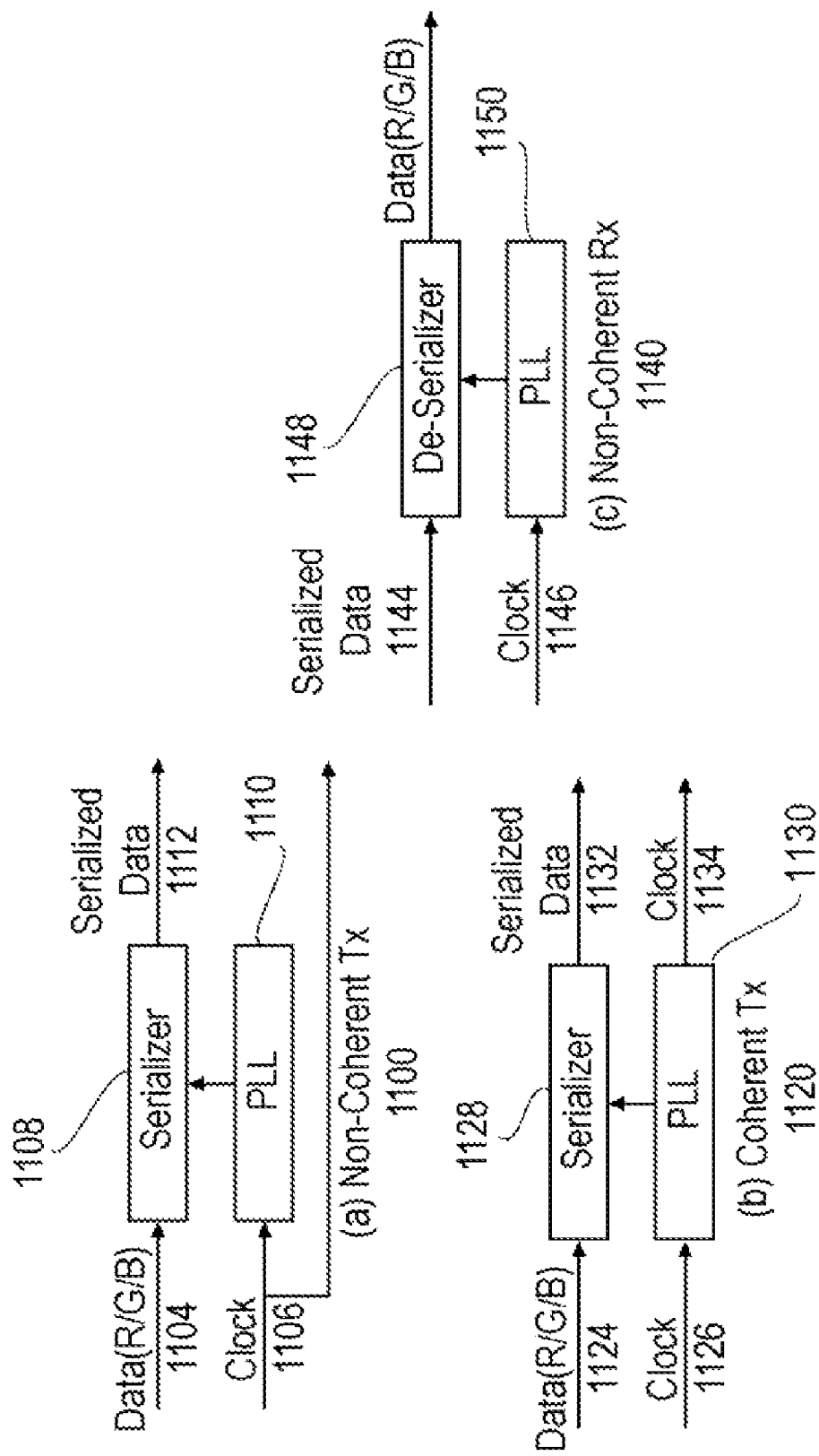
FIG. 11 provides a simplified diagram of embodiments of a non-coherent transmitter, a coherent transmitter, and a non-coherent receiver.

FIG. 11 provides a simplified diagram of embodiments of (a) a non-coherent transmitter (TX) 1100, (b) a coherent transmitter 1120, and (c) a non-coherent receiver (RX) 1140. In a non-coherent transmitter, data (R/G/B) 1104 is processed by a serializer 1108 to generate serialized data 1112 using the clock 1106 that passes through a PLL 1110. For this reason, serialized data 1112 has the delay of the PLL. On the other hand, for clock channel, the clock signal 1106 itself is passed directly through, instead of passing through PLL prior to being sent out. Thus, the clock in the clock channel does not have the delay of PLL. This difference in delay between data and clock is compensated in a non-coherent receiver. In non-coherent receiver 1140, de-serializer 1148 gets the serialized data 1144 and the clock 1146 passes through the PLL 1150. So, the clock used in de-serializer has the delay provided by PLL 1150. Thus, if the delay of the transmitter's PLL 1110 and that of the receiver's PLL 1150 match, the clock and data relationship also match at the de-serializer 1148.

However, if the transmitter is coherent 1120, clock channel 1134 also transmits the clock signal 1126 that already passes through the PLL. Thus if receiver 1140 is non-coherent, the clock signal 1146 used in de-serializer 1148 has delay imposed by both transmitter PLL 1130 and receiver PLL 1150 Therefore, a delay mismatch occurs between the clock and the data at the de-serializer 1148. This mismatch affects the over-sampled data and results in large and fast jitter movement.

Conventional systems and methods to solve this problem have focused on the digital phase tracker residing in the de-serializer. In other words, such systems and methods focused on the way to handle large and fast jitter caused by delay mismatch instead of focusing on how to remove such a delay mismatch from the start. This invention first tackles this problem itself (i.e., how to reduce the delay mismatch), and then proposes a way to handle large and fast jitter.

In some embodiments, a "PLL bandwidth searching" technique is used to find an optimal bandwidth for the input stream. In some embodiments, a "clock sampling" technique that shows the jitter characteristics of current data channels is utilized. These two techniques may be applied separately, or may be applied simultaneously for improved performance. The overall result is an improved performance in handling coherent input stream in non-coherent receivers.

Figure 12A:
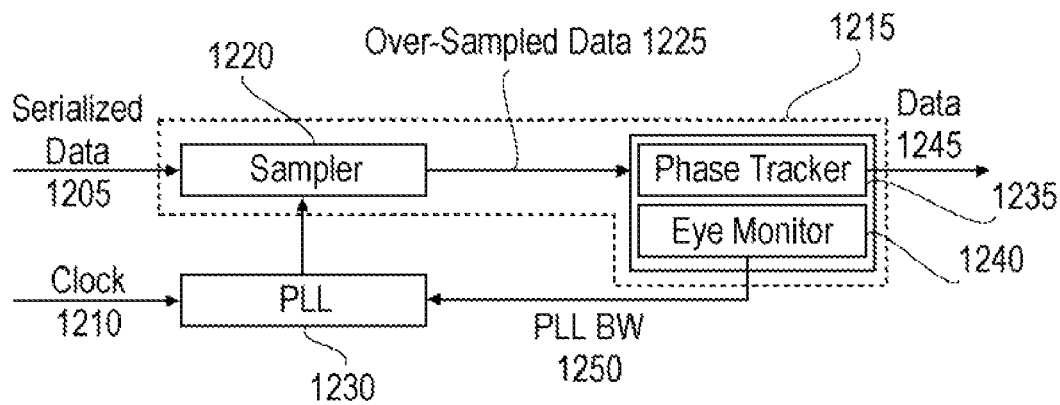
FIG. 12A illustrates an embodiment of an over-sampling receiver.

The PLL bandwidth searching technique may be used to minimize the delay difference between clock and data is to increase the bandwidth of the receiver PLL. If the bandwidth (BW) is increased, the PLL delay becomes smaller, thus the delay difference between data and clock also becomes smaller (for coherent transmitters). However, the BW should be increased blindly because, for non-coherent transmitter's, the reduced delay of Rx PLL means larger delay mismatch. Thus, it is necessary to adjust B/W based on the transmitter's characteristics (especially transmitter PLL's delay, i.e., BW). FIG. 12A illustrates an embodiment of an over-sampling receiver. FIG. 12A shows an approach including a de-serializer 1215 that receives serialized data 1205 and a clock signal 1210. In this illustration, a sampler 1220 over-samples incoming serialized data 1205 and a phase tracker 1235 selects a value among the over-sampled data to generate the decoded data 1245. In addition, an eye monitor 1240 examines the eye quality. The eye monitor 1240 determines a phase lock loop's 1230 characteristics (bandwidth 1250) based on the eye quality. The determination of characteristics is based on the fact that the delay mismatch between data and clock affects the eye of over-sampled data. If there is a big mismatch, which may occur if there is a large and fast jitter, this results in a smaller eye opening. On the other hand, if there is only a small mismatch, the eye may open wider. In some embodiments, based on these facts, several different candidates of PLL B/W's are attempted one by one, with the eye quality being reported from the eye monitor. The best PLL B/W may then be chosen for the current incoming input stream. To prevent too much frequent modifications of PLL bandwidth, a filter of some kind (such as a counter) is utilized, and the bandwidth thus only changes only if the system has monitored a sufficient number of eyes.

Figure 12B:
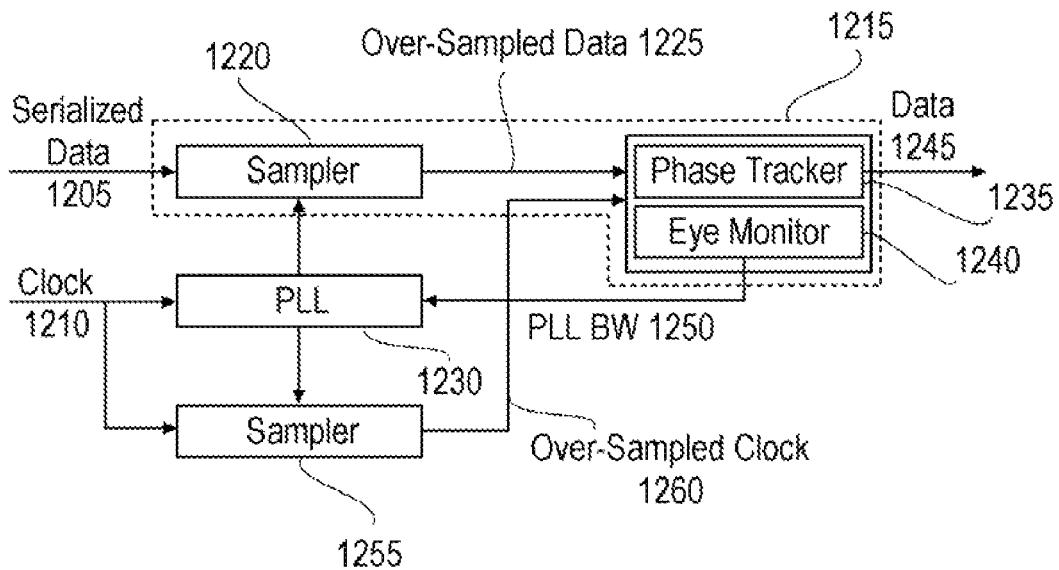
FIG. 12B illustrates an embodiment of clock sampling in a receiver.

The following describes a clock sampling technique: Certain prior proposed methods to handle large and fast jitter caused by the delay mismatch encounter a problem if the data does not include enough data transitions (i.e., transitions from "1" to "0" or from "0" to "1"). This is because one method to recognize jitter movement includes looking at the data edge (transition) movements. However, in some data streams, it is possible there will be very low transition density. In such a case, it may not be possible to recognize the jitter movement fast enough to track it, and this results in errors, such as pixel errors in video data. To address this problem, a method may use the "clock sampling" technique. FIG. 12B illustrates an embodiment of clock sampling in a receiver. Many of the elements of FIG. 12B are similar to elements of FIG. 12A. In conventional systems, a clock signal in the clock channel is used only to generate the clock signal. In some embodiments, rather than being limited to generating a clock, a system also samples the clock signal itself. In addition to the elements illustrated in FIG. 12A, a second sampler 1255 is provided to sample the clock signal to provide an over-sampled clock signal 1260. The over-sampled clock signal 1260 may include two transitions in each cycle, which is sufficient to track the fast and large jitter caused by the delay mismatch even if there are very few transitions in data stream. For example, in TMDS (Transition Minimalized Differential Signaling) coding, there can be 22 consecutive "1's" (or "0's") in the incoming data. This case may be among the most difficult cases to track correctly. However, even in such a case, by sampling the clock, it is possible to detect the jitter movement quickly and accurately.

Figure 13:
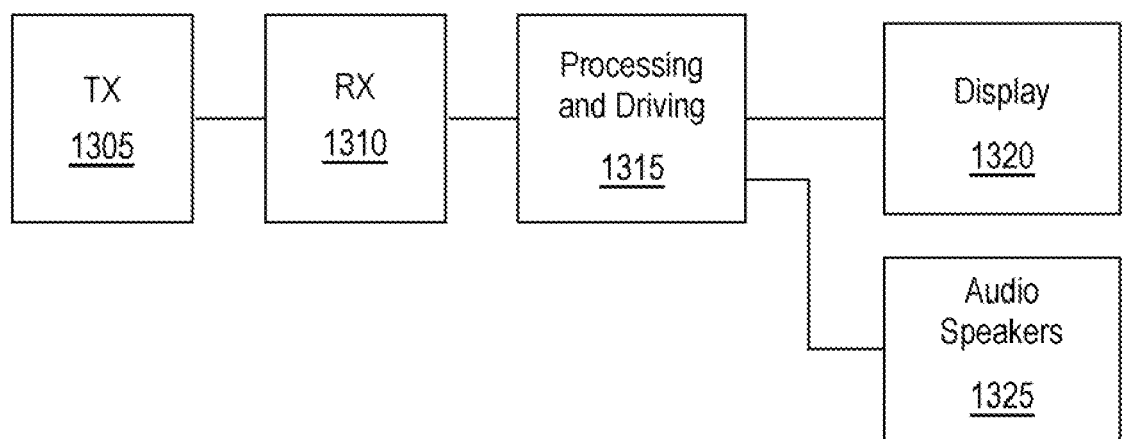
FIG. 13 illustrates an embodiment of a data system.

Digital Visual Interface (DVI) is a video interface standard of the Digital Display Working Group for use with display devices such as flat panel LCD displays and digital projectors. High-Definition Multimedia Interface (HDMI) is an interface standard for digital audio/video interfaces. These interface standards may be used in, for example, the system of FIG. 13, which illustrates an embodiment of a data system. As illustrated, the data system includes a first network device, shown as transmitter 1305, to transmit data. The data may include, but is not limited to, media data. The data system further includes a second network device, shown as receiver 1310, to receive the transmitted data. The receiver 1310 provides the receiving data to a module or modules for processing and driving the data 1315. In this illustration, the data is provided to media devices shown as a display 1320 and audio speakers 1325.

Some embodiments provide for handling both DVI compliant and DVI non-compliant input video streams in products including HDMI compliant products, or other streams of differing eye quality. DVI includes a specification regarding the eye characteristics that transmitters and receivers are required to meet for interoperability. However, some transmitters in the market do not follow the DVI specification, and are thus DVI non-compliant transmitters. In such a case, phase trackers that expect signals from DVI compliant transmitter may from time to time show poor results (e.g., a noisy screen for audio-visual data) with signals from DVI non-compliant transmitters. In addition, some users may want to use a spread-spectrum clock to reduce the electromagnetic interference (EMI) in such a way that the input stream becomes DVI non-compliant. Thus, it would be desirable for a phase tracker to be able to handle both DVI compliant inputs and DVI non-compliant inputs.

The DVI compliant input and DVI non-compliant input may have a difference in eye shape. If there is an examination over a longer period of time (at least over numerous cycles), the eye of DVI compliant input is open at least 50%. On the other hand, if there is an examination over a long time, the eye of DVI non-compliant input may be closed part of the time. Due to this difference, a good phase tracking algorithm for DVI compliant inputs is to examine the eye for numerous cycles and pick one of the clean spots (that is, over-sampled data aligned to the clean spot) in the eye—for example as described in this disclosure. This approach is called a "non tracking algorithm." On the other hand, the best approach for DVI non-compliant inputs may be to track the eye movement to align the center pointer to the center of the moving eye. This approach is called a "tracking algorithm", and is described in more detail below. In some embodiments, two different algorithms may be used to handle both DVI compliant and DVI non-compliant input streams.

In some embodiments, a "dual engine" approach is provided that uses both DVI compliant and DVI non-compliant algorithms and automatically selects one of them based on the input streams. In another embodiment, a "single merged engine" approach merges both of these engines into a single engine.

Sometimes, DVI compliant signals are said to be "non-coherent" in that in the transmitter, the clock signal does not pass through a PLL that is used to create the data signals to be transmitted. Some DVI non-compliant transmitters have the clock signal pass through a PLL that is used to create the data signals to be transmitted. This is sometimes said to be "coherent" and adds an extra delay that sometimes leads to some closed eyes.

Figure 14A:
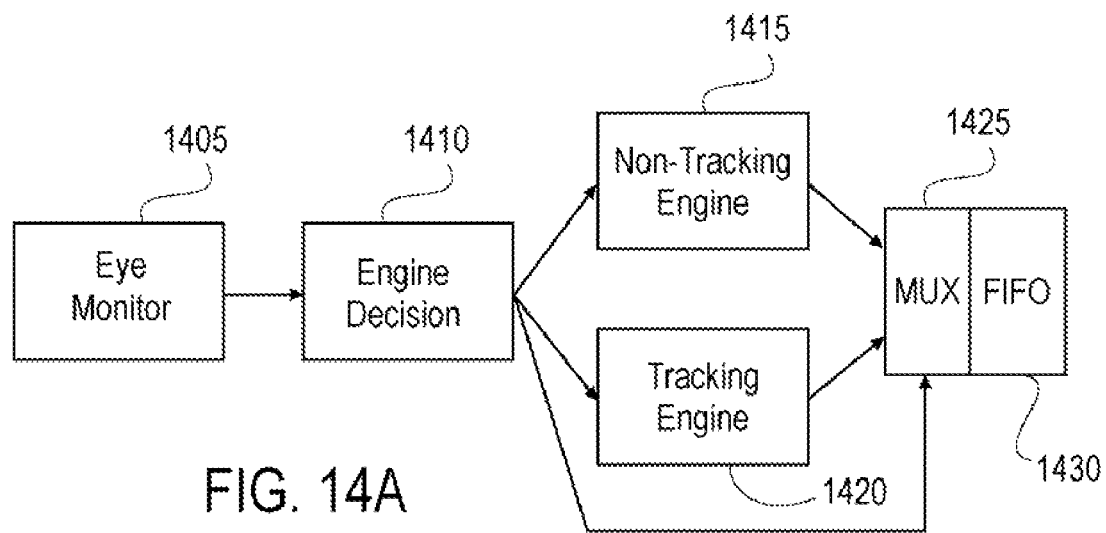
FIG. 14A illustrates an embodiment of a dual engine approach for data processing.

FIG. 14A illustrates an embodiment of a dual engine approach for data processing. This illustration includes an eye monitor 1405, an engine decision 1410, a non-tracking engine 1415, a tracking engine 1420, and a MUX (multiplexer) 1425 & FIFO (First-in, First-out buffer) 1430. The eye monitor 1405 monitors the eye opening by counting the number of transitions over each sampler. The output of eye monitor may be an indication of "how much the eye opens" and "which part of the eye is clean." The "engine decision" gets the output of "eye monitor" and decides the engine to use for the current input stream. If eye is open more than a particular value (for example, 40%), the non-tracking algorithm is selected since the eye meets the DVI specification, while if it is not the case (i.e., DVI non-compliant) the tracking algorithm is selected. In selecting the engine, a kind of low pass filter (or a counter) is used to give enough time to the eye monitor to gather enough information on eye openness. If it is too short, the eye monitor may report eye openness incorrectly based on local information gathered for a short time. For example, the eye monitor may indicate the "eye is open more than 40%" even if the eye is actually closed. Further, it may result in noise on the screen image. The particular value can be different value than 40%, for example, 50%, or 45%, or some other value.

In the non-tracking engine, the number of transitions is counted over each sampler, the best and worst sampler is decided, and the best center pointer is chosen. Some additional examples of details are provided herein. The tracking engine tracks the movement of the eye as described herein. The "MUX & FIFO" part gets the outputs from the two engines and selects one of them based on the output of "engine decision" block. In addition, it may do other tasks such as byte aligning, decoding, etc.

Figure 14B:
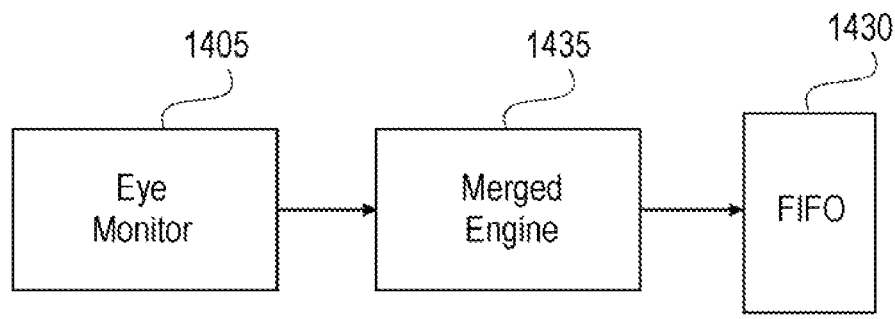
FIG. 14B illustrates an embodiment of a single merged engine approach for data processing.

FIG. 14B illustrates an embodiment of a single merged engine approach including three parts: an "eye monitor" 1405, "merged engine" 1435, and "FIFO" 1430.

The "eye monitor" 1405 is the same as in the "dual engine" approach. It sends out "how much eye is open" and "which part is clean among the possible center pointers". In the "merged single engine" this information is used as well as the decision from the tracking algorithm. One of various implementations is represented in pseudo-code as follows:

```
if(|(bp_candid[0 : 4] & s_min[0 : 4]) && eye_40_open)
    bp[0 : 4] <= #0.1 bp_candid[0 : 4];
end else if(|(bp[0 : 4] & s_min[0 : 4]) && eye_40_open)
    bp[0 : 4] <= #0.1 bp[0 : 4];
end else
    bp[0 : 4] <= #0.1 bp_candid[0 : 4];
```

In this example, bp_candid is the best center pointer candidates decided by the tracking algorithm, s_min is the clean center pointers coming from "eye monitor", and eye_40_open is the indication whether eye is open more than 40% (coming also from "eye monitor"). In some embodiments, there is first a check whether there is a common center pointer between the candidate from the tracking algorithm and the clean points from the eye monitor if and only if the eye is open more than 40%. If it is the case, this center pointer is selected. If it is not the case, then there is a check of the common center pointer between the current best center pointer (bp) and the clean center pointers from the "eye monitor". If there is a common part, this is selected. If it is not the case, the center pointer from the tracking algorithm is selected. In other words, if the eye is open more than 40%, a selection is made from the clean center pointer, while if eye is closed, the process simply follows the tracking algorithm. In this process, s_min is updated only after the eye monitor gathers enough information on the eye. Otherwise, s_min may have premature information and lead the algorithm to follow a non-tracking algorithm incorrectly.

As used herein, the term "embodiment" refers to an implementation. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. Different references to "some embodiments" do not necessarily refer to the same "some embodiments."

If the specification states a component, feature, structure, or characteristic "may", "might", or "could" be included, that particular component, feature, structure, or characteristic is not required to be included. If the specification or claim refers to "a" structure, that does not mean there is only one of the structure.

While the inventions have been described in terms of several embodiments, the invention should not limited to only those embodiments described, but can be practiced with modification and alteration within the spirit and scope of the appended claims. The description is thus to be regarded as illustrative instead of limiting.

The following are some claims that claim some aspects of the inventions. Various additional aspects of the inventions as described above may be claimed including in systems and methods.

What is claimed is:

1. An apparatus comprising:
   an equalizer to equalize received data values;
   a sampler to over-sample the equalized data;
   an eye monitor to generate information regarding quality of signal eyes for the over-sampled data;
   an equalization monitor to generate information regarding sufficiency of signal equalization; and
   a scan engine to scan possible values of a plurality of parameters for the apparatus, the scanning of the parameters including adjusting the parameters and evaluating the parameters based on received signal quality information, the received signal quality information including the information regarding sufficiency of signal equalization from the equalization monitor and the information regarding the quality of signal eyes for the over-sampled data from the eye monitor.

2. The apparatus of claim 1, wherein the scan engine further provides signals to the eye monitor to relax quality requirements for the signal eyes.

3. The apparatus of claim 2, wherein the signals to relax quality requirements comprise a number of eyes that are required to be open.

4. The apparatus of claim 3, wherein the scan engine decreases the number of eyes required to be open if the scan engine completes a scan sequence of possible parameters without identifying sufficient parameters.

5. The apparatus of claim 4, wherein the number of eyes required may be reduced until the number reaches a lower limit.

6. The apparatus of claim 1, wherein the scanning of the parameters includes a pruning technique in which a first parameter of the plurality of parameters is established followed by establishing the other parameters of the plurality of parameters.

7. The apparatus of claim 6, wherein the first parameter is equalization.

8. The apparatus of claim 1, further comprising a phase tracker to track a phase of the over-sampled data.

9. The apparatus of claim 8, wherein the phase tracker is to choose a tracking algorithm based at least in part on the eye monitor information.

10. The apparatus of claim 1, further comprising a phase lock loop circuit, the sampler operating in response to a clock signal from the phase lock loop.

11. The apparatus of claim 10, wherein the plurality of parameters includes a bandwidth for the phase lock loop circuit.

12. The apparatus of claim 10, further comprising a second sampler, the second sampler to sample the clock signal.

13. A chip comprising:
    an equalizer to equalize data;
    a sampler to over-sample the data in response to a locked loop circuit;

an eye monitor to provide eye quality information;
a equalization monitor to provide information regarding the current equalization; and
a scan engine to provide parameter signals to affect the quality of the over-sampled data in response to the eye quality information and the equalization monitor.

14. The chip of claim 13, wherein the eye monitor includes a first counter to count if a sufficient number of signal eyes are open and a second counter to count if a sufficient number of signal eyes are not open.

15. The chip of claim 14, wherein the eye monitor further include a third counter to count a number of eyes open and a comparator to compare the number of eyes open to a number of open eyes that are required.

16. The chip of claim 13, wherein the scan engine changes the parameter signals until the eye monitor determines that the eyes of the over-sampled data are of sufficient quality and the equalization monitor determines that the equalization is sufficient.

17. The chip of claim 13, wherein the equalization monitor is to base the equalization information at least in part on a width of a data pulse.

18. The chip of claim 17, wherein the width is determined determining a number of samples occurring with the same value.

19. The chip of claim 13, wherein the eye monitor includes a non-tracking engine and a tracking engine, the eye monitor to utilize the non-tracking engine if a signal eye is open more than a certain value and to utilize the tracking engine if the signal eye is not open more than the value.

20. A method comprising:
receiving a series of signals;
equalizing the received signals using an equalization value;
generating a clock signal, the generation of the clock signal being based at least in part on a bandwidth value;
over-sampling the received signals using the clock signal;
monitoring the equalization and eye quality of the received signals;
scanning possible values of a plurality of parameters, the plurality of parameters including the equalization value and the bandwidth value; and
identifying a combination of parameters for data reception.

21. The method of claim 20, wherein the scanning of the possible values of parameters includes setting the equalization value if equalization is sufficient, followed by scanning possible values of the other parameters.

22. The method of claim 20, wherein the equalization is monitored based at least in part on a width of a data pulse.

23. The method of claim 20, wherein the eye quality is monitored using a count of signal eyes open in the received signals.

24. The method of claim 23, further comprising modifying a required eye quality if no combination of the parameters results in sufficient signal quality.

25. A network comprising:
a first network device, the first network device including a transmitter to transmit media data; and
a second network device, the second network device including a receiver to receive media data, the receiver including:
an equalizer to equalize received media data values;
a sampler to over-sample the equalized media data;
an eye monitor to generate information regarding quality of signal eyes for the over-sampled media data;
an equalization monitor to generate information regarding sufficiency of signal equalization; and
a scan engine to scan possible values of a plurality of parameters for the apparatus, the scanning of the parameters including adjusting the parameters and evaluating the parameters based on received signal quality information, the received signal quality information including the information regarding sufficiency of signal equalization from the equalization monitor and the information regarding the quality of signal eyes for the over-sampled data from the eye monitor.

* * * * *